(12) United States Patent
Yun et al.

(10) Patent No.: US 9,407,488 B2
(45) Date of Patent: Aug. 2, 2016

(54) APPARATUS AND METHOD FOR REDUCING PAPR OF PREAMBLE SIGNAL IN DIGITAL BROADCASTING SYSTEM

(71) Applicant: Samsung Electronics Co., Ltd., Gyeonggi-do (KR)

(72) Inventors: Sung-Ryul Yun, Gyeonggi-do (KR); Hwan-Joon Kwon, Gyeonggi-do (KR); Jae-Yoel Kim, Gyeonggi-do (KR); Yeon-Ju Lim, Seoul (KR); Hak-Ju Lee, Incheon (KR); Hong-Sil Jeong, Seoul (KR); Seho Myung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 51 days.

(21) Appl. No.: 14/315,725

(22) Filed: Jun. 26, 2014

(65) Prior Publication Data
US 2014/0307831 A1    Oct. 16, 2014

Related U.S. Application Data

(63) Continuation of application No. 12/431,438, filed on Apr. 28, 2009, now abandoned.

(30) Foreign Application Priority Data

Apr. 28, 2008 (KR) .................. 10-2008-0039137

(51) Int. Cl.
*H04Q 11/02* (2006.01)
*H04L 27/26* (2006.01)

(52) U.S. Cl.
CPC ........ *H04L 27/2633* (2013.01); *H04L 27/2618* (2013.01)

(58) Field of Classification Search
CPC .................. H04L 27/2633; H04L 27/2618
See application file for complete search history.

(56) References Cited

U.S. PATENT DOCUMENTS

| | | | |
|---|---|---|---|
| 7,627,046 B1 | 12/2009 | Dick et al. | |
| 7,961,591 B2 | 6/2011 | Abedi | |
| 2004/0136464 A1 | 7/2004 | Suh et al. | |
| 2005/0089109 A1 | 4/2005 | Yun et al. | |
| 2005/0100108 A1 | 5/2005 | Yun et al. | |
| 2005/0152480 A1 | 7/2005 | Chang et al. | |
| 2006/0008037 A1 | 1/2006 | Chang et al. | |
| 2006/0050799 A1* | 3/2006 | Hou .................. | H04J 13/0062 375/260 |
| 2006/0093074 A1 | 5/2006 | Chang et al. | |
| 2006/0114812 A1 | 6/2006 | Kim et al. | |
| 2007/0217329 A1* | 9/2007 | Abedi ................ | H04L 27/2614 370/208 |
| 2007/0230600 A1 | 10/2007 | Bertrand et al. | |

(Continued)

FOREIGN PATENT DOCUMENTS

| | | |
|---|---|---|
| CN | 1849761 | 10/2006 |
| JP | 2006-507753 | 3/2006 |

(Continued)

*Primary Examiner* — Ayaz Sheikh
*Assistant Examiner* — Hai-Chang Hsiung
(74) *Attorney, Agent, or Firm* — The Farrell Law Firm, P.C.

(57) ABSTRACT

Methods and apparatuses are provided for reducing a Peak to Average Power Ratio (PAPR) in a digital broadcasting system. Reserved tones are determined in previously determined locations of sub-carriers that do not collide with a pilot signal of a preamble in a frame. A signal is transmitted through the reserved tones in a period for which the preamble is transmitted. If a Fast Fourier Transform (FFT) size is 8K, locations of the reserved tones are determined in accordance with a specified chart.

20 Claims, 4 Drawing Sheets

(56) References Cited

U.S. PATENT DOCUMENTS

| | | | |
|---|---|---|---|
| 2008/0037611 A1* | 2/2008 | Coon | H04L 27/2626 375/145 |
| 2008/0095277 A1 | 4/2008 | Cheng | |
| 2008/0159421 A1* | 7/2008 | Chen | H04L 27/2614 375/260 |
| 2009/0190677 A1* | 7/2009 | Jokela | H04L 1/0071 375/260 |

FOREIGN PATENT DOCUMENTS

| | | |
|---|---|---|
| JP | 2007-504748 | 3/2007 |
| JP | 2007-259445 | 10/2007 |
| JP | 2008-508803 | 3/2008 |
| KR | 1020050011058 | 1/2005 |
| KR | 1020050040055 | 5/2005 |
| KR | 1020050074884 | 7/2005 |
| KR | 1020060001734 | 1/2006 |
| KR | 1020060037806 | 5/2006 |
| KR | 1020070061688 | 6/2007 |
| KR | 1020070106914 | 11/2007 |
| RU | 2 278 474 | 6/2006 |
| WO | WO 2006/015108 | 2/2006 |
| WO | WO 2008/036727 | 3/2008 |
| WO | WO 2008/038248 | 4/2008 |

* cited by examiner

APPARATUS AND METHOD FOR REDUCING PAPR OF PREAMBLE SIGNAL IN DIGITAL BROADCASTING SYSTEM

PRIORITY

This application is a Continuation application of U.S. patent application Ser. No. 12/431,438, filed in the U.S. Patent and Trademark Office on Apr. 28, 2009, which claims priority under 35 U.S.C. §119(a) to a Korean Patent Application filed in the Korean Intellectual Property Office on Apr. 28, 2008 and assigned Serial No. 10-2008-0039137, the entire disclosure of which is incorporated herein by reference.

BACKGROUND OF THE INVENTION

1. Field of the Invention

The present invention relates generally to a transmission apparatus and method in a digital broadcasting system. More particularly, the present invention relates to an apparatus and method for reducing a Peak to Average Power Ratio (PAPR) of a preamble signal in a digital broadcasting system.

2. Description of the Related Art

Digital broadcasting systems are broadcasting systems that use digital transmission technologies, such as Digital Audio Broadcasting (DAB), Digital Video Broadcasting (DVB) and Digital Multimedia Broadcasting (DMB).

Among them, the DVB system, which is a European digital broadcasting technology, is a transmission standard that supports existing digital broadcast services for fixed terminals as well as digital multimedia services for mobile and portable terminals.

In the DVB system, it is possible to multiplex Moving Picture Experts Group 2 Transport Stream (MPEG 2 TS)-based broadcast data and simultaneously transmit Internet Protocol (IP)-based data streams. Further, in the DVB system, several services can be multiplexed to one IP stream and transmitted. After receiving data of the transmitted IP stream, a user terminal can demultiplex the received data back into individual services, demodulate the services, and display the demodulated services on a screen of the user terminal. In this case, the user terminal requires information about various types of services provided in the DVB system, the details contained in each of the services, etc.

The DVB system uses an Orthogonal Frequency Division Multiplexing (OFDM) transmission scheme. Although the OFDM transmission scheme is similar to the conventional Frequency Division Multiplexing (FDM) scheme, the OFDM scheme is distinguishable from conventional transmission schemes in that OFDM can achieve optimal transmission efficiency during high-speed data transmission by maintaining orthogonality between multiple sub-carriers. Also, the advantages of high frequency use efficiency and robustness against multi-path fading contribute significantly to the optimal transmission efficiency.

In addition, the OFDM transmission scheme, as it overlaps frequency spectra, is efficiently uses frequencies, is robust against frequency selective fading, can reduce influence of Inter-Symbol Interference (ISI) by using a guard interval, enables simple designs of hardware equalizers, and is robust against impulsive noises. Thus, the OFDM transmission scheme is widely used for communication systems.

Despite the advantages of the OFDM transmission scheme, the multi-carrier modulation of the OFDM transmission scheme causes a high Peak to Average Power Ratio (PAPR). Since the OFDM transmission scheme transmits data using multiple carriers, a final OFDM signal suffers a significant change in amplitude as a level of its amplitude is determined by a sum of amplitude levels of the respective carriers. When the carriers are equal in phase, the OFDM signal will have a very high amplitude. This high-PAPR signal may deviate from a linear operation range of a high-power linear amplifier, and a signal that has passed through the high-power linear amplifier may often suffer from distortion, causing a reduction in system performance.

Various plans to solve the high-PAPR problem occurring in the OFDM system have been proposed, and the plans include several PAPR reduction techniques, such as clipping, coding, SeLected Mapping (SLM), Partial Transmit Sequence (PTS), and Tone Injection (TI).

A Tone Reservation (TR) scheme, one of the PAPR reduction techniques, reserves some tones in sub-carriers, and the reserved tones are used to reduce PAPR instead of transmitting data. A receiver bypasses the reserved tones that do not carry information signals, and restores information signals only in data tones other than the reserved tones, thus contributing to a simplified structure of the receiver. A gradient algorithm is a typical one of the methods that reduce PAPR using reserved tones in the TR scheme. The gradient algorithm is defined by applying a method similar to the clipping technique to the TR scheme. The gradient algorithm is used to create a signal (or a kernel) having an impulse characteristic using reserved tones that carry no information signal, and to clip off an output signal of an Inverse Fast Fourier Transform (IFFT) unit. When the signal having an impulse characteristic is added to the output signal of the IFFT unit, distortion of data occurs only in the reserved tones, and data in other frequency regions is not distorted, i.e., the TR scheme is different from the clipping technique in that the noise caused by clipping has an effect only on some reserved sub-carriers without affecting all sub-carriers. The gradient algorithm optimizes impulse waveforms so that a peak of an IFFT output signal is reduced in the time domain. A signal, a PAPR of which was reduced by adding a sum of the impulse waveforms optimized by the gradient algorithm to the output signal of the IFFT unit, is transmitted to a receiver. The receiver only needs to receive data on the remaining sub-carriers since the receiver is notified of the locations of the reserved tones in advance.

Figure 1:
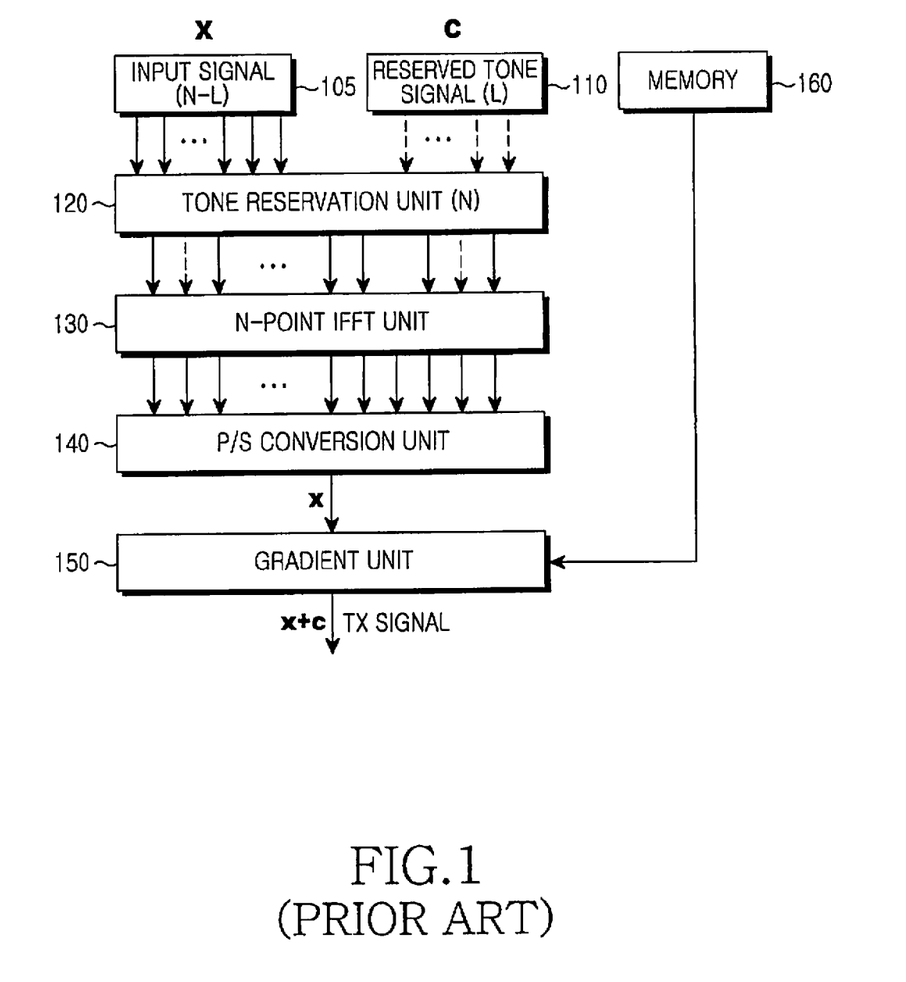
FIG. 1 illustrates a structure of a TR-based transmitter.

FIG. 1 illustrates a structure of a transmitter to which a general TR scheme is applied.

Referring to FIG. 1, an input signal X 105 having N-L points (where N denotes a size of IFFT) and an L-reserved tone signal C 110 (a signal consisting of L reserved tones) are input to a tone reservation unit 120, and the tone reservation unit 120 reserves L reserved tones in sub-carrier locations previously agreed between a transmitter and a receiver. The L reserved tones carry no data and have zeros (0s) inserted therein. When a sum of the parallel data X and the L reserved tones is input to an N-point IFFT unit 130, the input sum undergoes IFFT computation in the N-point IFFT unit 130, and then a time-domain output signal x is generated by a parallel-to-serial (P/S) conversion unit 140. Next, a gradient unit 150 creates a signal c by optimizing impulse waveforms according to the gradient algorithm so that a peak of the IFFT output signal is reduced, and adds the created signal c to the output signal x that has passed through the IFFT unit 130 and the P/S conversion unit 140. The output signal of the gradient unit 150 is transmitted to the receiver. The gradient unit 150 calculates the signal c that is added to the output signal x so that PAPR of the output signal x is reduced, using impulse waveforms read from a memory 160. For reference, uppercases X and C in FIG. 1 represent frequency-domain signals being input to the IFFT unit 130, while lowercases x and c represent time-domain signals output from the IFFT unit 130.

The signal c that is added to the output signal x to reduce PAPR in L reserved tones, is determined as follows. L sub-carriers are reserved in advance and used to determine a code C for calculation of the signal c, and locations of the L sub-carriers are fixed by the tone reservation unit 120 during initial transmission, and remain unchanged during data transmission. The code C represents the reserved tone signal, and $C_k$ represents sub-carrier locations of reserved tones as defined in Equation (1) below.

$$C_k = \begin{cases} C_k, & k \in \{i_1, i_2, \ldots, i_L\} \\ 0, & k \notin \{i_1, i_2, \ldots, i_L\} \end{cases} \quad (1)$$

where k denotes sub-carrier indexes of reserved tones in the tone reservation unit 110. The input signal X 105 is reserved in sub-carriers aside from the reserved tone signal C 110 as shown in Equation (2).

$$X_k = \begin{cases} X_k, & k \notin \{i_1, i_2, \ldots, i_L\} \\ 0, & k \in \{i_1, i_2, \ldots, i_L\} \end{cases} \quad (2)$$

where $X_k$ denotes sub-carrier locations of data tones.

PAPR minimization is achieved by optimizing amplitudes of the L sub-carriers. $\tilde{C}$ for PAPR minimization is optimized by Equation (3) below such that PAPR of an output signal x is reduced. Here, $\tilde{C}$ corresponds to the signal c.

$$\tilde{C} = \underset{\tilde{C}}{Arg\min} \left( \max_{n=0 \sim N-1} |x_u + c_n| \right) \quad (3)$$

where $C_n$ is a value of an n-th element in a time-domain vector c determined by IFFT-processing a vector C. Computation of Equation (3) is performed to find an optimized signal for the signal c. Although complex linear computation is conducted to solve Equation (3), the gradient algorithm is performed in actual implementations, which can achieve the similar performance through simple computations.

The signal c is optimized to remove a peak-to-peak value of a vector x (i.e., an output signal). If $x^{clip}$ is assumed to be a vector where an output signal x is clipped to a certain level A, then Equation (4) is derived.

$$x - x^{clip} = \Sigma_i \beta_i \delta[n - m_i] \quad (4)$$

where $\beta_i$ denotes a clipping value, $m_i$ denotes a location where the vector is clipped, and $\delta$ denotes an impulse function.

If the signal c is defined as Equation (5), Equation (6) can be derived and a peak-to-peak value of a transmission symbol can be reduced.

$$c = -\Sigma_i \beta_i \delta[n - m_i] \quad (5)$$

$$x + c = x^{clip} \quad (6)$$

Therefore, the signal c added to the output signal x can be construed as a sum of delayed and scaled impulse functions. However, in a frequency domain, $\tilde{C}$=FFT(c) has a non-zero value at most frequencies, and distorts values of data symbols in locations other than the reserved L locations. Thus, there is a need to use, for clipping, waveforms having characteristics of an impulse function, which are affected only in the L reserved locations but not affected in other locations in the frequency domain.

Waveforms having impulse characteristics are designed as follows.

Assume that $1_L$ represents a vector having a value of 1 in L reserved locations and a value of 0 in other locations, and p is defined as Equation (7).

$$p = p[n] = [p_0 p_1 \ldots p_{N-1}] = \frac{\sqrt{N}}{1} IFFT(1_L) \quad (7)$$

In Equation (7), $p_0$=1, and $p_1 \ldots p_{N-1}$ have significantly small values compared to $p_0$. Assuming that $p[((n-m_i))_N]$ indicates a value determined by cyclic-shifting p by $m_i$, even though Discrete Fourier Transform (DFT) is performed thereon, the resulting value changes only in phase and has a value of 0 in locations other than the L reserved locations in the frequency domain.

As described above, the waveforms having impulse characteristics are designed such that amplitudes of the remaining $p_1 \ldots p_{N-1}$ except for $p_0$ are low, in order for the waveforms to become similar to ideal impulse waveforms. As amplitudes of $p_1 \ldots p_{N-1}$ are lower, a change in amplitudes of other signals except for $p_0$ is less significant during clipping. If the design is made such that $p_1 \ldots p_{N-1}$ have high amplitudes, peaks of other signals may increase again in the clipping process, thereby causing a reduction in PAPR reduction performance.

Figure 2:
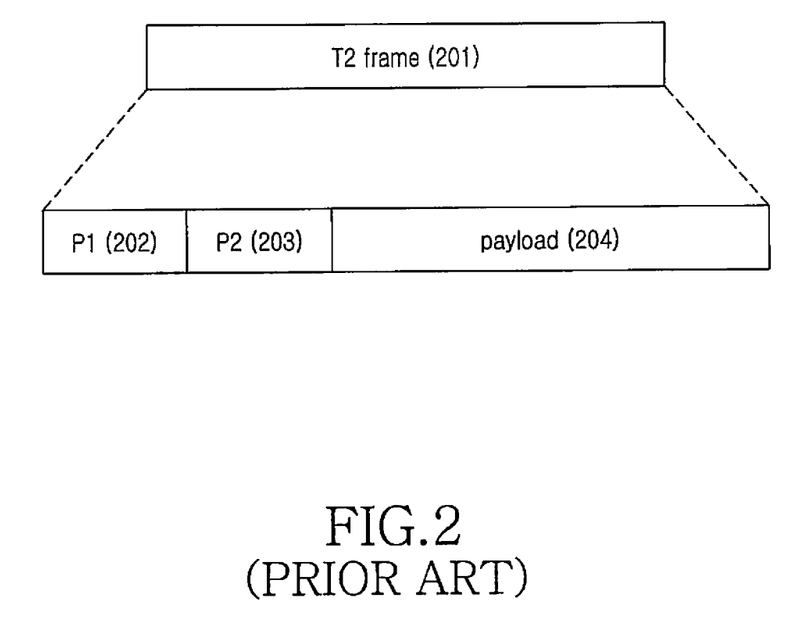
FIG. 2 illustrates a frame structure of a DVB system.

FIG. 2 illustrates a frame structure for a physical layer of a general DVB system using OFDM.

A frame structure 201 of FIG. 2 can be roughly divided into preamble parts 202 and 203, and a payload part 204. The preamble parts 202 and 203 carry signaling information of the frame, and the payload part 204 is used to transmit data.

The P1 preamble 202 is used at a receiver to scan an initial signal of the frame. Further, the P1 preamble 202 is used to detect a frequency offset and tune the center frequency. Next, the P2 preamble 203 is used to provide Layer 1 (L1) signaling of the DVB system. The L1 signaling includes such information as transmission types, transmission parameters, etc. of the DVB system. Finally, the payload 204 carries service data provided in the DVB system.

In the communication system that uses the OFDM transmission scheme and transmits the frame including preambles, it is important to reduce PAPR in order to improve the system performance, and the high-PAPR problem occurs not only in the payload part in which data is transmitted, but also in the preamble parts in which signaling information is transmitted, in the physical layer frame. Therefore, there is a need for reducing PAPR, including reducing PAPR in the preamble parts of a frame.

SUMMARY OF THE INVENTION

The present invention has been designed to address at least the above-mentioned problems and/or disadvantages and to provide at least the advantages described below. Accordingly, an aspect of the present invention provides a transmission method and apparatus capable of reducing PAPR of a preamble in an OFDM system.

Another aspect of the present invention provides a transmission method and apparatus capable of reducing PAPR of a preamble in a digital broadcasting system using an OFDM transmission scheme.

Another aspect of the present invention provides PAPR reduction apparatus and method suitable for a preamble structure in a digital broadcasting system.

Another aspect of the present invention provides a transmission apparatus and method for determining locations of reserved tones used for PAPR reduction in a preamble in a digital broadcasting system.

In accordance with an aspect of the present invention, a method is provided for reducing a PAPR in a digital broadcasting system. Reserved tones are determined in previously determined locations of sub-carriers that do not collide with a pilot signal of a preamble in a frame. A signal is transmitted through the reserved tones in a period for which the preamble is transmitted. If an FFT size is 8K, locations of the reserved tones are determined in accordance with a specified chart.

In accordance with another aspect of the present invention, a transmission apparatus is provided for reducing a PAPR in a digital broadcasting system. The transmission apparatus includes a controller for determining reserved tones in previously determined locations of sub-carriers that do not collide with a pilot signal of a preamble in a frame. The transmission apparatus also includes a transmission unit for transmitting a signal through the reserved tones in a period for which the preamble is transmitted. If an FFT size is 8K, locations of the reserved tones are determined in accordance with a specified chart.

In accordance with another aspect of the present invention, a receiving apparatus is provided for reducing a PAPR in a digital broadcasting system. The apparatus includes a memory storing previously determined locations of sub-carriers. The apparatus is arranged to receive a signal through reserved tones in the previously determined locations of sub-carriers that do not collide with a pilot signal of a preamble in a frame. If an FFT size is 8K, locations of the reserved tones are determined in accordance with a specified chart.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

The following description with reference to the accompanying drawings is provided to assist in a comprehensive understanding of embodiments of the present invention. Accordingly, the description includes various specific details to assist in that understanding but these are to be regarded as merely exemplary. Further, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to dictionary meanings, but are merely used by the inventor to enable a clear and consistent understanding of the invention. It should be apparent to those skilled in the art that the following description of exemplary embodiments of the present invention are provided for illustration purpose only and not for the purpose of limiting the present invention as defined by the appended claims and their equivalents.

In the following description, a method and apparatus for reducing PAPR of a preamble will be described in connection with a digital broadcasting system such as a DVB system for convenience purpose only. However, the present invention can be equally applied to any communication system that uses an OFDM transmission scheme and transmits a frame having a structure in which preambles are included.

The preamble structure described in FIG. 2 is an example of a preamble structure to which the present invention is applicable, and it is not intended to limit the scope of the present invention to the particular preamble structure. For example, the present invention can be applied to any preamble structure that can be divided into one preamble part or divided into two or more preamble parts.

As described above, there is a need to reduce PAPR of a preamble in a digital broadcasting system. For PAPR reduction, a DVB system may reserve some sub-carriers for a P2 preamble to employ a TR scheme among several PAPR reduction techniques. Thus, reserved tones may be designed in accordance with the P2 preamble structure.

In a digital broadcasting system employing the TR scheme, reserved tones must not collide with a pilot, and determined such that waveforms having impulse characteristics that occur due to the reserved tones are suitable for PAPR reduction. This is because locations of the reserved tones have an influence on PAPR performance.

Figure 3:
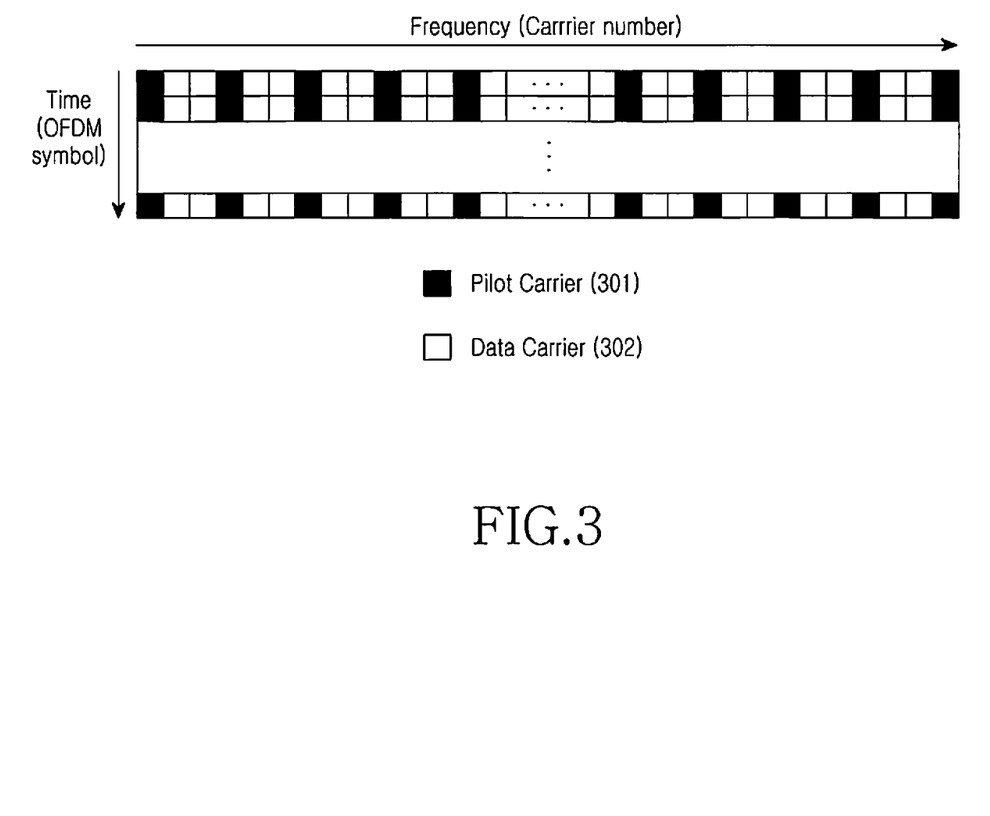
FIG. 3 illustrates a structure of an OFDM symbol carrying a P2 preamble in a DVB system according to an embodiment of the present invention.

FIG. 3 illustrates an OFDM symbol carrying a P2 preamble in a digital broadcasting system according to an exemplary embodiment of the present invention.

Referring to FIG. 3, sub-carriers for transmission of an OFDM symbol are divided into a pilot part 301 for channel estimation and a data part 302 through which signaling information is transmitted. The pilot part 301 exists in the locations determined by Equation (8).

$$k \bmod 3 = 0 \quad (8)$$

where k denotes a sub-carrier index, and 'mod' represents a module operation. In accordance with Equation (8), a pilot tone is located in every third sub-carrier in the frequency domain.

The digital broadcasting system, to which the present invention is applied, supports a plurality of Fast Fourier Transform (FFT) modes (e.g., 1K, 2K, 4K, 8K, 16K, and 32K), and a P2 preamble exists in each FFT mode. In the digital broadcasting system, the number of OFDM symbols carrying a P2 preamble is determined according to each of the FFT modes, and Table 1 below illustrates the number of OFDM symbols for each FFT mode.

TABLE 1

| FFT mode | Number of OFDM symbols |
|---|---|
| 1K | 16 |
| 2K | 8 |

TABLE 1-continued

| FFT mode | Number of OFDM symbols |
|---|---|
| 4K | 4 |
| 8K | 2 |
| 16K | 1 |
| 32K | 1 |

Referring to Table 1, a P2 preamble is transmitted for a 16-OFDM symbol period in a 1K FFT mode, and for a 1-OFDM symbol period in 16K and 32K FFT modes.

The TR scheme for reducing PAPR in the P2 preamble of the digital broadcasting system may use some of data sub-carriers through which signaling information is transmitted. In application of the TR scheme, it is important how to design the reserved tones since PAPR reduction performance depends on the reserved tones.

That is, locations of reserved tones in the P2 preamble 203 of FIG. 2 should be designed not to collide with a pilot signal (or pilot tones) for channel estimation, and waveforms having impulse characteristics caused by the reserved tones must be designed to be suitable for PAPR reduction. In other words, locations of the reserved tones must be determined in Equation (7) such that $p_1 \ldots p_{N-1}$ have small values.

The number of and locations of reserved tones for reducing PAPR of a P2 preamble, proposed by the present invention, are shown in Table 2 and Table 3. The number of reserved tones differs according to FFT size, the reserved tones are designed not to collide with a pilot signal (or pilot tones), and the waveforms having impulse characteristics are designed to have good PAPR reduction performance.

Table 2 shows the number of and indexes of reserved tones for 1K, 2K, and 4K FFT modes, and Table 3 shows the number of and indexes of reserved tones for 8K, 16K, and 32K FFT modes.

TABLE 2

| FFT mode (Number of reserved tones) | Indexes of Reserved tones |
|---|---|
| 1K (10) | 116, 130, 134, 157, 182, 256, 346, 478, 479, 532 |
| 2K (18) | 113, 124, 262, 467, 479, 727, 803, 862, 910, 946, 980, 1201, 1322, 1342, 1396, 1397, 1562, 1565 |
| 4K (36) | 104, 116, 119, 163, 170, 664, 886, 1064, 1151, 1196, 1264, 1531, 1736, 1951, 1960, 2069, 2098, 2311, 2366, 2473, 2552, 2584, 2585, 2645, 2774, 2846, 2882, 3004, 3034, 3107, 3127, 3148, 3191, 3283, 3289 |

TABLE 3

| FFT mode (Number of reserved tones) | Indexes of reserved tones |
|---|---|
| 8K (72) | 106, 109, 110, 112, 115, 118, 133, 142, 163, 184, 206, 247, 445, 461, 503, 565, 602, 656, 766, 800, 922, 1094, 1108, 1199, 1258, 1726, 1793, 1939, 2128, 2714, 3185, 3365, 3541, 3655, 3770, 3863, 4066, 4190, 4282, 4565, 4628, 4727, 4882, 4885, 5143, 5192, 5210, 5257, 5261, 5459, 5651, 5809, 5830, 5986, 6020, 6076, 6253, 6269, 6410, 6436, 6467, 6475, 6509, 6556, 6611, 6674, 6685, 6689, 6691, 6695, 6698, 6701 |
| 16K (144) | 104, 106, 107, 109, 110, 112, 113, 115, 116, 118, 119, 121, 122, 125, 128, 131, 134, 137, 140, 143, 161, 223, 230, 398, 482, 497, 733, 809, 850, 922, 962, 1196, 1256, 1262, 1559, 1691, 1801, 1819, 1937, 2005, 2095, 2308, 2383, 2408, 2425, 2428, 2479, 2579, 2893, 2902, 3086, 3554, 4085, 4127, 4139, 4151, 4163, 4373, 4400, 4576, 4609, 4952, 4961, 5444, 5756, 5800, 6094, 6208, 6658, 6673, 6799, 7208, 7682, 8101, 8135, 8230, 8692, 8788, 8933, 9323, 9449, 9478, 9868, 10192, 10261, 10430, 10630, 10685, 10828, 10915, 10930, 10942, 11053, 11185, 11324, 11369, 11468, 11507, 11542, 11561, 11794, 11912, 11974, 11978, 12085, 12179, 12193, 12269, 12311, 12758, 12767, 12866, 12938, 12962, 12971, 13099, 13102, 13105, 13120, 13150, 13280, 13282, 13309, 13312, 13321, 13381, 13402, 13448, 13456, 13462, 13463, 13466, 13478, 13492, 13495, 13498, 13501, 13502, 13504, 13507, 13510, 13513, 13514, 13516 |
| 32K (288) | 104, 106, 107, 109, 110, 112, 113, 115, 118, 121, 124, 127, 130, 133, 136, 139, 142, 145, 148, 151, 154, 157, 160, 163, 166, 169, 172, 175, 178, 181, 184, 187, 190, 193, 196, 199, 202, 205, 208, 211, 404, 452, 455, 467, 509, 539, 568, 650, 749, 1001, 1087, 1286, 1637, 1823, 1835, 1841, 1889, 1898, 1901, 2111, 2225, 2252, 2279, 2309, 2315, 2428, 2452, 2497, 2519, 3109, 3154, 3160, 3170, 3193, 3214, 3298, 3331, 3346, 3388, 3397, 3404, 3416, 3466, 3491, 3500, 3572, 4181, 4411, 4594, 4970, 5042, 5069, 5081, 5086, 5095, 5104, 5320, 5465, 5491, 6193, 6541, 6778, 6853, 6928, 6934, 7030, 7198, 7351, 7712, 7826, 7922, 8194, 8347, 8350, 8435, 8518, 8671, 8861, 8887, 9199, 9980, 10031, 10240, 10519, 10537, 10573, 10589, 11078, 11278, 11324, 11489, 11642, 12034, 12107, 12184, 12295, 12635, 12643, 12941, 12995, 13001, 13133, 13172, 13246, 13514, 13522, 13939, 14362, 14720, 14926, 15338, 15524, 15565, 15662, 15775, 16358, 16613, 16688, 16760, 17003, 17267, 17596, 17705, 18157, 18272, 18715, 18994, 19249, 19348, 20221, 20855, 21400, 21412, 21418, 21430, 21478, 21559, 21983, 21986, 22331, 22367, 22370, 22402, 22447, 22535, 22567, 22571, 22660, 22780, 22802, 22844, 22888, 22907, 23021, 23057, 23086, 23213, 23240, 23263, 23333, 23369, 23453, 23594, 24143, 24176, 24319, 24325, 24565, 24587, 24641, 24965, 25067, 25094, 25142, 25331, 25379, 25465, 25553, 25589, 25594, 25655, 25664, 25807, 25823, 25873, 25925, 25948, 26002, 26008, 26102, 26138, 26141, 26377, 26468, 26498, 26510, 26512, 26578, |

TABLE 3-continued

| FFT mode (Number of reserved tones) | Indexes of reserved tones |
|---|---|
| | 26579, 26588, 26594, 26597, 26608, 26627, 26642, 26767, 26776, 26800, 26876, 26882, 26900, 26917, 26927, 26951, 26957, 26960, 26974, 26986, 27010, 27013, 27038, 27044, 27053, 27059, 27061, 27074, 27076, 27083, 27086, 27092, 27094, 27098, 27103, 27110, 27115, 27118, 27119, 27125, 27128, 27130, 27133, 27134, 27140, 27143, 27145, 27146, 27148, 27149 |

The structure of FIG. 1 can be used as a transmitter to which the TR scheme according to an embodiment of the present invention is applied. As one example, the tone reservation unit 120 reserves reserved tones to transmit a signal having an impulse characteristic in locations of sub-carriers that do not collide with a pilot signal of a preamble in a frame (e.g., in sub-carrier locations previously agreed between a transmitter and a receiver as shown in Table 2 and/or Table 3 in accordance with the reserved tone indexes for respective FFT modes). As another example of the transmitter structure, the tone reservation unit 120 and the gradient unit 150 may be formed as a controller (not shown).

Figure 4:
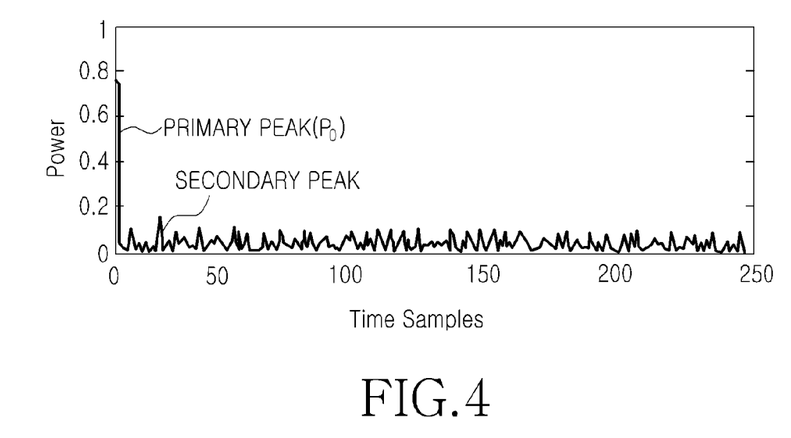
FIG. 4 illustrates a waveform having an impulse characteristic determined by reserved tones in a digital broadcasting system according to an embodiment of the present invention.

FIG. 4 illustrates a waveform having an impulse characteristic of a P2 preamble in a digital broadcasting system according to an exemplary embodiment of the present invention. Performance of a waveform having an impulse characteristic can be represented by a ratio of power of $p_0$ to the highest power among powers of $p_1 \sim p_{N-1}$ in Equation (7). Here, $p_0$ indicates the primary peak, while the highest power among the powers of the remaining $p_1 \sim p_{N-1}$ is called the secondary peak, which is set lower than the primary peak.

Table 4 below shows the secondary peak for the reserved tones designed in Table 2 and Table 3.

TABLE 4

| FFT mode | Secondary peak [dB] |
|---|---|
| 1K | −4.3199 |
| 2K | −6.5913 |
| 4K | −9.1721 |
| 8K | −10.4574 |
| 16K | −10.8517 |
| 32K | −10.9473 |

Referring to Table 4, when locations of the reserved tones for 8K, 16K, and 32K FFT modes are set as shown in Table 3, values of the secondary peaks are significantly reduced.

Figure 5:
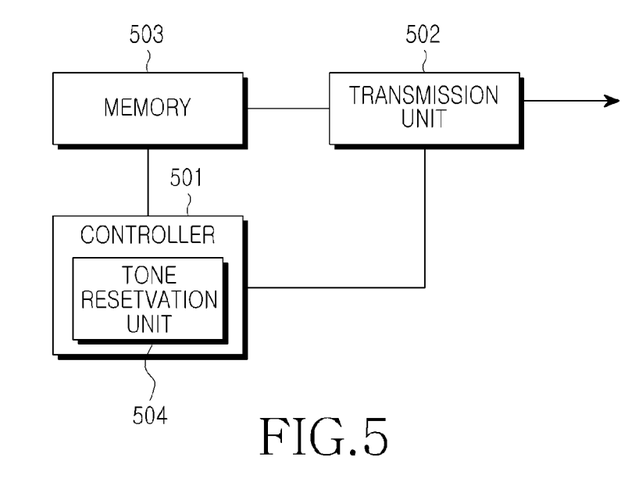
FIG. 5 is a block diagram illustrating a transmission apparatus according to an embodiment of the present invention.

FIG. 5 is a block diagram illustrating a transmission apparatus according to an embodiment of the present invention.

Referring to FIG. 5, the transmission apparatus includes a controller 501, a transmission unit 502, and a memory 503. Additionally, the controller 501 includes a tone reservation unit 504 that determines reserved tones used to transmit a signal having an impulse characteristic in locations of sub-carriers that do not collide with a pilot signal of a preamble in a frame. Alternatively, the controller 501 may simply perform the function of the tone reservation unit 504.

The transmission unit 502 transmits a frame in which a preamble is included, the memory 503 stores indexes of reserved tones used to transmit a signal having an impulse characteristic in previously determined locations of sub-carriers that do not collide with a pilot signal of the preamble, and the controller 501 generates the signal having the impulse characteristic according to the indexes of the reserved tones and controls the transmission unit 503 so as to transmit the signal having the impulse characteristic through the reserved tones in a symbol period for which the preamble is transmitted.

Figure 6:
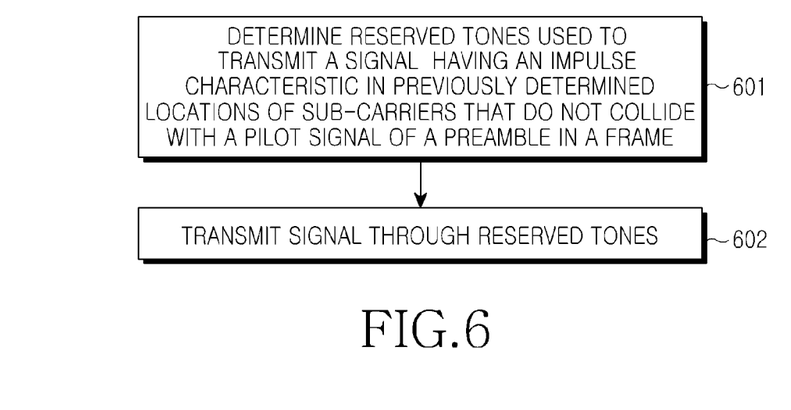
FIG. 6 is a flow chart illustrating a transmission method according to an embodiment of the present invention.

FIG. 6 is a flow chart illustrating a transmission method according to an embodiment of the present invention.

Referring to FIG. 6, in step 601, a transmission apparatus determines reserved tones used to transmit a signal having an impulse characteristic in previously determined locations of sub-carriers that do not collide with a pilot signal of a preamble in a frame. In step 602, the transmission apparatus transmits the signal having the impulse characteristic through the reserved tones in a symbol period for which the preamble is transmitted.

As is apparent from the foregoing description, the present invention can reduce PAPR of a preamble while preventing the preamble from colliding with a pilot signal in a digital broadcasting system.

In addition, the present invention can provide reserved tones having good PAPR reduction performance for a preamble in a digital broadcasting system.

Embodiments of the present invention can also be embodied as computer-readable codes on a computer-readable recording medium. Computer-readable recording mediums include any data storage device that can store data, which can thereafter be read by a computer system. Examples of the computer-readable recording mediums include, but are not limited to, Read-Only Memory (ROM), Random-Access Memory (RAM), Compact Disc (CD)-ROMs, magnetic tapes, floppy disks, optical data storage devices, and carrier waves (such as data transmission through the Internet via wired or wireless transmission paths). Computer-readable recording mediums can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:
1. A method for reducing a Peak to Average Power Ratio (PAPR) in a digital broadcasting system, comprising:
   determining reserved tones in previously determined locations of sub-carriers that are different from a pilot signal of a preamble in a frame; and
   transmitting a signal through the reserved tones in a period for which the preamble is transmitted, wherein if a Fast Fourier Transform (FFT) size is 8K, locations of the reserved tones are determined in accordance with:

| FFT mode (Number of reserved tones) | Indexes of reserved tones |
|---|---|
| 8K (72) | 106, 109, 110, 112, 115, 118, 133, 142, 163, 184, 206, 247, 445, 461, 503, 565, 602, 656, 766, 800, 922, 1094, 1108, 1199, 1258, 1726, 1793, 1939, 2128, 2714, 3185, 3365, 3541, 3655, 3770, 3863, 4066, 4190, 4282, 4565, 4628, 4727, 4882, 4885, 5143, 5192, 5210, 5257, 5261, 5459, 5651, 5809, 5830, 5986, 6020, 6076, 6253, 6269, 6410, 6436, 6467, 6475, 6509, 6556, 6611, 6674, 6685, 6689, 6691, 6695, 6698, 6701 |

2. The method of claim 1, wherein the digital broadcasting system uses Orthogonal Frequency Division Multiplexing (OFDM) as a transmission scheme.

3. The method of claim 1, wherein when the FFT size is 16K, the locations of the reserved tones are determined in accordance with:

| FFT mode (Number of reserved tones) | Indexes of reserved tones |
|---|---|
| 16K (144) | 104, 106, 107, 109, 110, 112, 113, 115, 116, 118, 119, 121, 122, 125, 128, 131, 134, 137, 140, 143, 161, 223, 230, 398, 482, 497, 733, 809, 850, 922, 962, 1196, 1256, 1262, 1559, 1691, 1801, 1819, 1937, 2005, 2095, 2308, 2383, 2408, 2425, 2428, 2479, 2579, 2893, 2902, 3086, 3554, 4085, 4127, 4139, 4151, 4163, 4373, 4400, 4576, 4609, 4952, 4961, 5444, 5756, 5800, 6094, 6208, 6658, 6673, 6799, 7208, 7682, 8101, 8135, 8230, 8692, 8788, 8933, 9323, 9449, 9478, 9868, 10192, 10261, 10430, 10630, 10685, 10828, 10915, 10930, 10942, 11053, 11185, 11324, 11369, 11468, 11507, 11542, 11561, 11794, 11912, 11974, 11978, 12085, 12179, 12193, 12269, 12311, 12758, 12767, 12866, 12938, 12962, 12971, 13099, 13102, 13105, 13120, 13150, 13280, 13282, 13309, 13312, 13321, 13381, 13402, 13448, 13456, 13462, 13463, 13466, 13478, 13492, 13495, 13498, 13501, 13502, 13504, 13507, 13510, 13513, 13514, 13516 |

4. The method of claim 1, wherein when the FFT size is 32K, the locations of the reserved tones are determined in accordance with:

| FFT mode (Number of reserved tones) | Indexes of reserved tones |
|---|---|
| 32K (288) | 104, 106, 107, 109, 110, 112, 113, 115, 118, 121, 124, 127, 130, 133, 136, 139, 142, 145, 148, 151, 154, 157, 160, 163, 166, 169, 172, 175, 178, 181, 184, 187, 190, 193, 196, 199, 202, 205, 208, 211, 404, 452, 455, 467, 509, 539, 568, 650, 749, 1001, 1087, 1286, 1637, 1823, 1835, 1841, 1889, 1898, 1901, 2111, 2225, 2252, 2279, 2309, 2315, 2428, 2452, 2497, 2519, 3109, 3154, 3160, 3170, 3193, 3214, 3298, 3331, 3346, 3388, 3397, 3404, 3416, 3466, 3491, 3500, 3572, 4181, 4411, 4594, 4970, 5042, 5069, 5081, 5086, 5095, 5104, 5320, 5465, 5491, 6193, 6541, 6778, 6853, 6928, 6934, 7030, 7198, 7351, 7712, 7826, 7922, 8194, 8347, 8350, 8435, 8518, 8671, 8861, 8887, 9199, 9980, 10031, 10240, 10519, 10537, 10573, 10589, 11078, 11278, 11324, 11489, 11642, 12034, 12107, 12184, 12295, 12635, 12643, 12941, 12995, 13001, 13133, 13172, 13246, 13514, 13522, 13939, 14362, 14720, 14926, 15338, 15524, 15565, 15662, 15775, 16358, 16613, 16688, 16760, 17003, 17267, 17596, 17705, 18157, 18272, 18715, 18994, 19249, 19348, 20221, 20855, 21400, 21412, 21418, 21430, 21478, 21559, 21983, 21986, 22331, 22367, 22370, 22402, 22447, 22535, 22567, 22571, 22660, 22780, 22802, 22844, 22888, 22907, 23021, 23057, 23086, 23213, 23240, 23263, 23333, 23369, 23453, 23594, 24143, 24176, 24319, 24325, 24565, 24587, 24641, 24965, 25067, 25094, 25142, 25331, 25379, 25465, 25553, 25589, 25594, 25655, 25664, 25807, 25823, 25873, 25925, 25948, 26002, 26008, 26102, 26138, 26141, 26377, 26468, 26498, 26510, 26512, 26578, 26579, 26588, 26594, 26597, 26608, 26627, 26642, 26767, 26776, 26800, 26876, 26882, 26900, 26917, 26927, 26951, 26957, 26960, 26974, 26986, 27010, 27013, 27038, 27044, 27053, 27059, 27061, 27074, 27076, 27083, 27086, 27092, 27094, 27098, 27103, 27110, 27115, 27118, 27119, 27125, 27128, 27130, 27133, 27134, 27140, 27143, 27145, 27146, 27148, 27149 |

5. The method of claim 2, wherein when OFDM supports a plurality of FFT sizes, the locations of the reserved tones are determined in accordance with:

| FFT mode (Number of reserved tones) | Indexes of reserved tones |
|---|---|
| 16K (144) | 104, 106, 107, 109, 110, 112, 113, 115, 116, 118, 119, 121, 122, 125, 128, 131, 134, 137, 140, 143, 161, 223, 230, 398, 482, 497, 733, 809, |

| FFT mode (Number of reserved tones) | Indexes of reserved tones |
|---|---|
| | 850, 922, 962, 1196, 1256, 1262, 1559, 1691, 1801, 1819, 1937, 2005, 2095, 2308, 2383, 2408, 2425, 2428, 2479, 2579, 2893, 2902, 3086, 3554, 4085, 4127, 4139, 4151, 4163, 4373, 4400, 4576, 4609, 4952, 4961, 5444, 5756, 5800, 6094, 6208, 6658, 6673, 6799, 7208, 7682, 8101, 8135, 8230, 8692, 8788, 8933, 9323, 9449, 9478, 9868, 10192, 10261, 10430, 10630, 10685, 10828, 10915, 10930, 10942, 11053, 11185, 11324, 11369, 11468, 11507, 11542, 11561, 11794, 11912, 11974, 11978, 12085, 12179, 12193, 12269, 12311, 12758, 12767, 12866, 12938, 12962, 12971, 13099, 13102, 13105, 13120, 13150, 13280, 13282, 13309, 13312, 13321, 13381, 13402, 13448, 13456, 13462, 13463, 13466, 13478, 13492, 13495, 13498, 13501, 13502, 13504, 13507, 13510, 13513, 13514, 13516 |
| 32K (288) | 104, 106, 107, 109, 110, 112, 113, 115, 118, 121, 124, 127, 130, 133, 136, 139, 142, 145, 148, 151, 154, 157, 160, 163, 166, 169, 172, 175, 178, 181, 184, 187, 190, 193, 196, 199, 202, 205, 208, 211, 404, 452, 455, 467, 509, 539, 568, 650, 749, 1001, 1087, 1286, 1637, 1823, 1835, 1841, 1889, 1898, 1901, 2111, 2225, 2252, 2279, 2309, 2315, 2428, 2452, 2497, 2519, 3109, 3154, 3160, 3170, 3193, 3214, 3298, 3331, 3346, 3388, 3397, 3404, 3416, 3466, 3491, 3500, 3572, 4181, 4411, 4594, 4970, 5042, 5069, 5081, 5086, 5095, 5104, 5320, 5465, 5491, 6193, 6541, 6778, 6853, 6928, 6934, 7030, 7198, 7351, 7712, 7826, 7922, 8194, 8347, 8350, 8435, 8518, 8671, 8861, 8887, 9199, 9980, 10031, 10240, 10519, 10537, 10573, 10589, 11078, 11278, 11324, 11489, 11642, 12034, 12107, 12184, 12295, 12635, 12643, 12941, 12995, 13001, 13133, 13172, 13246, 13514, 13522, 13939, 14362, 14720, 14926, 15338, 15524, 15565, 15662, 15775, 16358, 16613, 16688, 16760, 17003, 17267, 17596, 17705, 18157, 18272, 18715, 18994, 19249, 19348, 20221, 20855, 21400, 21412, 21418, 21430, 21478, 21559, 21983, 21986, 22331, 22367, 22370, 22402, 22447, 22535, 22567, 22571, 22660, 22780, 22802, 22844, 22888, 22907, 23021, 23057, 23086, 23213, 23240, 23263, 23333, 23369, 23453, 23594, 24143, 24176, 24319, 24325, 24565, 24587, 24641, 24965, 25067, 25094, 25142, 25331, 25379, 25465, 25553, 25589, 25594, 25655, 25664, 25807, 25823, 25873, 25925, 25948, 26002, 26008, 26102, 26138, 26141, 26377, 26468, 26498, 26510, 26512, 26578, 26579, 26588, 26594, 26597, 26608, 26627, 26642, 26767, 26776, 26800, 26876, 26882, 26900, 26917, 26927, 26951, 26957, 26960, 26974, 26986, 27010, 27013, 27038, 27044, 27053, 27059, 27061, 27074, 27076, 27083, 27086, 27092, 27094, 27098, 27103, 27110, 27115, 27118, 27119, 27125, 27128, 27130, 27133, 27134, 27140, 27143, 27145, 27146, 27148, 27149 |

6. The method of claim 1, wherein the preamble comprises a P2 symbol that carries signaling information of a physical layer in a digital video broadcasting (DVB) system.

7. The method of claim 1, wherein transmitting the signal further comprises adding the signal having an impulse characteristic to an information signal that is transmitted through data tones in the preamble, using a gradient algorithm for PAPR reduction.

8. A transmission apparatus for reducing a Peak to Average Power Ratio (PAPR) in a digital broadcasting system, comprising:

a controller for determining reserved tones in previously determined locations of sub-carriers that are different from a pilot signal of a preamble in a frame; and a transmission unit for transmitting a signal through the reserved tones in a period for which the preamble is transmitted, wherein if a Fast Fourier Transform (FFT) size is 8K, locations of the reserved tones are determined in accordance with:

| FFT mode (Number of reserved tones) | Indexes of reserved tones |
|---|---|
| 8K (72) | 106, 109, 110, 112, 115, 118, 133, 142, 163, 184, 206, 247, 445, 461, 503, 565, 602, 656, 766, 800, 922, 1094, 1108, 1199, 1258, 1726, 1793, 1939, 2128, 2714, 3185, 3365, 3541, 3655, 3770, 3863, 4066, 4190, 4282, 4565, 4628, 4727, 4882, 4885, 5143, 5192, 5210, 5257, 5261, 5459, 5651, 5809, 5830, 5986, 6020, 6076, 6253, 6269, 6410, 6436, 6467, 6475, 6509, 6556, 6611, 6674, 6685, 6689, 6691, 6695, 6698, 6701 |

9. The transmission apparatus of claim 8, wherein the digital broadcasting system uses Orthogonal Frequency Division Multiplexing (OFDM) as a transmission scheme.

10. The transmission apparatus of claim 8, wherein when the FFT size is 16K, the locations of the reserved tones are determined in accordance with:

| FFT mode (Number of reserved tones) | Indexes of reserved tones |
|---|---|
| 16K (144) | 104, 106, 107, 109, 110, 112, 113, 115, 116, 118, 119, 121, 122, 125, 128, 131, 134, 137, 140, 143, 161, 223, 230, 398, 482, 497, 733, 809, 850, 922, 962, 1196, 1256, 1262, 1559, 1691, 1801, 1819, 1937, 2005, 2095, 2308, 2383, 2408, 2425, 2428, 2479, 2579, 2893, 2902, 3086, 3554, 4085, 4127, 4139, 4151, 4163, 4373, 4400, 4576, 4609, 4952, 4961, 5444, 5756, 5800, 6094, 6208, 6658, 6673, 6799, 7208, 7682, 8101, 8135, 8230, 8692, 8788, 8933, 9323, 9449, 9478, 9868, 10192, 10261, 10430, 10630, 10685, 10828, 10915, 10930, 10942, 11053, 11185, 11324, 11369, 11468, 11507, 11542, 11561, 11794, 11912, 11974, 11978, 12085, 12179, 12193, 12269, 12311, 12758, 12767, 12866, 12938, 12962, 12971, 13099, 13102, 13105, 13120, 13150, 13280, 13282, 13309, 13312, 13321, 13381, 13402, 13448, 13456, 13462, 13463, 13466, 13478, 13492, 13495, 13498, 13501, 13502, 13504, 13507, 13510, 13513, 13514, 13516 |

11. The transmission apparatus of claim 8, wherein when the FFT size is 32K, the locations of the reserved tones are determined in accordance with:

| FFT mode (Number of reserved tones) | Indexes of reserved tones |
|---|---|
| 32K (288) | 104, 106, 107, 109, 110, 112, 113, 115, 118, 121, 124, 127, 130, 133, 136, 139, 142, 145, 148, 151, 154, 157, 160, 163, 166, 169, 172, 175, 178, 181, 184, 187, 190, 193, 196, 199, 202, 205, 208, 211, 404, 452, 455, 467, 509, 539, 568, 650, 749, 1001, 1087, 1286, 1637, 1823, 1835, 1841, 1889, 1898, 1901, 2111, 2225, 2252, 2279, 2309, 2315, 2428, 2452, 2497, 2519, 3109, 3154, 3160, 3170, 3193, 3214, 3298, 3331, 3346, 3388, 3397, 3404, 3416, 3466, 3491, 3500, 3572, 4181, 4411, 4594, 4970, 5042, 5069, 5081, 5086, 5095, 5104, 5320, 5465, 5491, 6193, 6541, 6778, 6853, 6928, 6934, 7030, 7198, 7351, 7712, 7826, 7922, 8194, 8347, 8350, 8435, 8518, 8671, 8861, 8887, 9199, 9980, 10031, 10240, 10519, 10537, 10573, 10589, 11078, 11278, 11324, 11489, 11642, 12034, 12107, 12184, 12295, 12635, 12643, 12941, 12995, 13001, 13133, 13172, 13246, 13514, 13522, 13939, 14362, 14720, 14926, 15338, 15524, 15565, 15662, 15775, 16358, 16613, 16688, 16760, 17003, 17267, 17596, 17705, 18157, 18272, 18715, 18994, 19249, 19348, 20221, 20855, 21400, 21412, 21418, 21430, 21478, 21559, 21983, 21986, 22331, 22367, 22370, 22402, 22447, 22535, 22567, 22571, 22660, 22780, 22802, 22844, 22888, 22907, 23021, 23057, 23086, 23213, 23240, 23263, 23333, 23369, 23453, 23594, 24143, 24176, 24319, 24325, 24565, 24587, 24641, 24965, 25067, 25094, 25142, 25331, 25379, 25465, 25553, 25589, 25594, 25655, 25664, 25807, 25823, 25873, 25925, 25948, 26002, 26008, 26102, 26138, 26141, 26377, 26468, 26498, 26510, 26512, 26578, 26579, 26588, 26594, 26597, 26608, 26627, 26642, 26767, 26776, 26800, 26876, 26882, 26900, 26917, 26927, 26951, 26957, 26960, 26974, 26986, 27010, 27013, 27038, 27044, 27053, 27059, 27061, 27074, 27076, 27083, 27086, 27092, 27094, 27098, 27103, 27110, 27115, 27118, 27119, 27125, 27128, 27130, 27133, 27134, 27140, 27143, 27145, 27146, 27148, 27149 |

12. The transmission apparatus of claim 9, wherein when OFDM supports a plurality of FFT sizes, the locations of the reserved tones are determined in accordance with:

| FFT mode (Number of reserved tones) | Indexes of reserved tones |
|---|---|
| 16K (144) | 104, 106, 107, 109, 110, 112, 113, 115, 116, 118, 119, 121, 122, 125, 128, 131, 134, 137, 140, 143, 161, 223, 230, 398, 482, 497, 733, 809, 850, 922, 962, 1196, 1256, 1262, 1559, 1691, 1801, 1819, 1937, 2005, 2095, 2308, 2383, 2408, 2425, 2428, 2479, 2579, 2893, 2902, 3086, 3554, 4085, 4127, 4139, 4151, 4163, 4373, 4400, 4576, 4609, 4952, 4961, 5444, 5756, 5800, 6094, 6208, 6658, 6673, 6799, 7208, 7682, 8101, 8135, 8230, 8692, 8788, 8933, 9323, 9449, 9478, 9868, 10192, 10261, 10430, 10630, 10685, 10828, 10915, 10930, 10942, 11053, 11185, 11324, 11369, 11468, 11507, 11542, 11561, 11794, 11912, 11974, 11978, 12085, 12179, 12193, 12269, 12311, 12758, 12767, 12866, 12938, 12962, 12971, 13099, 13102, 13105, 13120, 13150, 13280, 13282, 13309, 13312, 13321, 13381, 13402, 13448, 13456, 13462, 13463, 13466, 13478, 13492, 13495, 13498, 13501, 13502, 13504, 13507, 13510, 13513, 13514, 13516 |

-continued

| FFT mode (Number of reserved tones) | Indexes of reserved tones |
| --- | --- |
| 32K (288) | 104, 106, 107, 109, 110, 112, 113, 115, 118, 121, 124, 127, 130, 133, 136, 139, 142, 145, 148, 151, 154, 157, 160, 163, 166, 169, 172, 175, 178, 181, 184, 187, 190, 193, 196, 199, 202, 205, 208, 211, 404, 452, 455, 467, 509, 539, 568, 650, 749, 1001, 1087, 1286, 1637, 1823, 1835, 1841, 1889, 1898, 1901, 2111, 2225, 2252, 2279, 2309, 2315, 2428, 2452, 2497, 2519, 3109, 3154, 3160, 3170, 3193, 3214, 3298, 3331, 3346, 3388, 3397, 3404, 3416, 3466, 3491, 3500, 3572, 4181, 4411, 4594, 4970, 5042, 5069, 5081, 5086, 5095, 5104, 5320, 5465, 5491, 6193, 6541, 6778, 6853, 6928, 6934, 7030, 7198, 7351, 7712, 7826, 7922, 8194, 8347, 8350, 8435, 8518, 8671, 8861, 8887, 9199, 9980, 10031, 10240, 10519, 10537, 10573, 10589, 11078, 11278, 11324, 11489, 11642, 12034, 12107, 12184, 12295, 12635, 12643, 12941, 12995, 13001, 13133, 13172, 13246, 13514, 13522, 13939, 14362, 14720, 14926, 15338, 15524, 15565, 15662, 15775, 16358, 16613, 16688, 16760, 17003, 17267, 17596, 17705, 18157, 18272, 18715, 18994, 19249, 19348, 20221, 20855, 21400, 21412, 21418, 21430, 21478, 21559, 21983, 21986, 22331, 22367, 22370, 22402, 22447, 22535, 22567, 22571, 22660, 22780, 22802, 22844, 22888, 22907, 23021, 23057, 23086, 23213, 23240, 23263, 23333, 23369, 23453, 23594, 24143, 24176, 24319, 24325, 24565, 24587, 24641, 24965, 25067, 25094, 25142, 25331, 25379, 25465, 25553, 25589, 25594, 25655, 25664, 25807, 25823, 25873, 25925, 25948, 26002, 26008, 26102, 26138, 26141, 26377, 26468, 26498, 26510, 26512, 26578, 26579, 26588, 26594, 26597, 26608, 26627, 26642, 26767, 26776, 26800, 26876, 26882, 26900, 26917, 26927, 26951, 26957, 26960, 26974, 26986, 27010, 27013, 27038, 27044, 27053, 27059, 27061, 27074, 27076, 27083, 27086, 27092, 27094, 27098, 27103, 27110, 27115, 27118, 27119, 27125, 27128, 27130, 27133, 27134, 27140, 27143, 27145, 27146, 27148, 27149 |

13. The transmission apparatus of claim 8, wherein the preamble comprises a P2 symbol that carries signaling information of a physical layer in a digital video broadcasting (DVB) system.

14. The transmission apparatus of claim 8, wherein the transmission unit further comprises a gradient unit that adds the signal having an impulse characteristic to an information signal that is transmitted through data tones in the preamble, using a gradient algorithm for PAPR reduction.

15. A receiving apparatus for reducing a Peak to Average Power Ratio (PAPR) in a digital broadcasting system, the apparatus comprising:
a memory storing previously determined locations of sub-carriers; and
the apparatus being arranged to receive a signal through reserved tones in the previously determined locations of sub-carriers that are different from a pilot signal of a preamble in a frame,
wherein if a Fast Fourier Transform (FFT) size is 8K, locations of the reserved tones are determined in accordance with:

| FFT mode (Number of reserved tones) | Indexes of reserved tones |
| --- | --- |
| 8K (72) | 106, 109, 110, 112, 115, 118, 133, 142, 163, 184, 206, 247, 445, 461, 503, 565, 602, 656, 766, 800, 922, 1094, 1108, 1199, 1258, 1726, 1793, 1939, 2128, 2714, 3185, 3365, 3541, 3655, 3770, 3863, 4066, 4190, 4282, 4565, 4628, 4727, 4882, 4885, 5143, 5192, 5210, 5257, 5261, 5459, 5651, 5809, 5830, 5986, 6020, 6076, 6253, 6269, 6410, 6436, 6467, 6475, 6509, 6556, 6611, 6674, 6685, 6689, 6691, 6695, 6698, 6701 |

16. The receiving apparatus of claim 15, wherein when the FFT size is 16K, the locations of the reserved tones are determined in accordance with:

| FFT mode (Number of reserved tones) | Indexes of reserved tones |
| --- | --- |
| 16K (144) | 104, 106, 107, 109, 110, 112, 113, 115, 116, 118, 119, 121, 122, 125, 128, 131, 134, 137, 140, 143, 161, 223, 230, 398, 482, 497, 733, 809, 850, 922, 962, 1196, 1256, 1262, 1559, 1691, 1801, 1819, 1937, 2005, 2095, 2308, 2383, 2408, 2425, 2428, 2479, 2579, 2893, 2902, 3086, 3554, 4085, 4127, 4139, 4151, 4163, 4373, 4400, 4576, 4609, 4952, 4961, 5444, 5756, 5800, 6094, 6208, 6658, 6673, 6799, 7208, 7682, 8101, 8135, 8230, 8692, 8788, 8933, 9323, 9449, 9478, 9868, 10192, 10261, 10430, 10630, 10685, 10828, 10915, 10930, 10942, 11053, 11185, 11324, 11369, 11468, 11507, 11542, 11561, 11794, 11912, 11974, 11978, 12085, 12179, 12193, 12269, 12311, 12758, 12767, 12866, 12938, 12962, 12971, 13099, 13102, 13105, 13120, 13150, 13280, 13282, 13309, 13312, 13321, 13381, 13402, 13448, 13456, 13462, 13463, 13466, 13478, 13492, 13495, 13498, 13501, 13502, 13504, 13507, 13510, 13513, 13514, 13516 |

17. The receiving apparatus of claim 15, wherein when the FFT size is 32K, the locations of the reserved tones are determined in accordance with:

| FFT mode (Number of reserved tones) | Indexes of reserved tones |
|---|---|
| 32K (288) | 104, 106, 107, 109, 110, 112, 113, 115, 118, 121, 124, 127, 130, 133, 136, 139, 142, 145, 148, 151, 154, 157, 160, 163, 166, 169, 172, 175, 178, 181, 184, 187, 190, 193, 196, 199, 202, 205, 208, 211, 404, 452, 455, 467, 509, 539, 568, 650, 749, 1001, 1087, 1286, 1637, 1823, 1835, 1841, 1889, 1898, 1901, 2111, 2225, 2252, 2279, 2309, 2315, 2428, 2452, 2497, 2519, 3109, 3154, 3160, 3170, 3193, 3214, 3298, 3331, 3346, 3388, 3397, 3404, 3416, 3466, 3491, 3500, 3572, 4181, 4411, 4594, 4970, 5042, 5069, 5081, 5086, 5095, 5104, 5320, 5465, 5491, 6193, 6541, 6778, 6853, 6928, 6934, 7030, 7198, 7351, 7712, 7826, 7922, 8194, 8347, 8350, 8435, 8518, 8671, 8861, 8887, 9199, 9980, 10031, 10240, 10519, 10537, 10573, 10589, 11078, 11278, 11324, 11489, 11642, 12034, 12107, 12184, 12295, 12635, 12643, 12941, 12995, 13001, 13133, 13172, 13246, 13514, 13522, 13939, 14362, 14720, 14926, 15338, 15524, 15565, 15662, 15775, 16358, 16613, 16688, 16760, 17003, 17267, 17596, 17705, 18157, 18272, 18715, 18994, 19249, 19348, 20221, 20855, 21400, 21412, 21418, 21430, 21478, 21559, 21983, 21986, 22331, 22367, 22370, 22402, 22447, 22535, 22567, 22571, 22660, 22780, 22802, 22844, 22888, 22907, 23021, 23057, 23086, 23213, 23240, 23263, 23333, 23369, 23453, 23594, 24143, 24176, 24319, 24325, 24565, 24587, 24641, 24965, 25067, 25094, 25142, 25331, 25379, 25465, 25553, 25589, 25594, 25655, 25664, 25807, 25823, 25873, 25925, 25948, 26002, 26008, 26102, 26138, 26141, 26377, 26468, 26498, 26510, 26512, 26578, 26579, 26588, 26594, 26597, 26608, 26627, 26642, 26767, 26776, 26800, 26876, 26882, 26900, 26917, 26927, 26951, 26957, 26960, 26974, 26986, 27010, 27013, 27038, 27044, 27053, 27059, 27061, 27074, 27076, 27083, 27086, 27092, 27094, 27098, 27103, 27110, 27115, 27118, 27119, 27125, 27128, 27130, 27133, 27134, 27140, 27143, 27145, 27146, 27148, 27149 |

18. The receiving apparatus of claim 15, wherein the digital broadcasting system uses Orthogonal Frequency Division Multiplexing (OFDM) as a transmission scheme.

19. The receiving apparatus of claim 18, wherein when OFDM supports a plurality of FFT sizes, the locations of the reserved tones are determined in accordance with:

| FFT mode (Number of reserved tones) | Indexes of reserved tones |
|---|---|
| 16K (144) | 104, 106, 107, 109, 110, 112, 113, 115, 116, 118, 119, 121, 122, 125, 128, 131, 134, 137, 140, 143, 161, 223, 230, 398, 482, 497, 733, 809, 850, 922, 962, 1196, 1256, 1262, 1559, 1691, 1801, 1819, 1937, 2005, 2095, 2308, 2383, 2408, 2425, 2428, 2479, 2579, 2893, 2902, 3086, 3554, 4085, 4127, 4139, 4151, 4163, 4373, 4400, 4576, 4609, 4952, 4961, 5444, 5756, 5800, 6094, 6208, 6658, 6673, 6799, 7208, 7682, 8101, 8135, 8230, 8692, 8788, 8933, 9323, 9449, 9478, 9868, 10192, 10261, 10430, 10630, 10685, 10828, 10915, 10930, 10942, 11053, 11185, 11324, 11369, 11468, 11507, 11542, 11561, 11794, 11912, 11974, 11978, 12085, 12179, 12193, 12269, 12311, 12758, 12767, 12866, 12938, 12962, 12971, 13099, 13102, 13105, 13120, 13150, 13280, 13282, 13309, 13312, 13321, 13381, 13402, 13448, 13456, 13462, 13463, 13466, 13478, 13492, 13495, 13498, 13501, 13502, 13504, 13507, 13510, 13513, 13514, 13516 |
| 32K (288) | 104, 106, 107, 109, 110, 112, 113, 115, 118, 121, 124, 127, 130, 133, 136, 139, 142, 145, 148, 151, 154, 157, 160, 163, 166, 169, 172, 175, 178, 181, 184, 187, 190, 193, 196, 199, 202, 205, 208, 211, 404, 452, 455, 467, 509, 539, 568, 650, 749, 1001, 1087, 1286, 1637, 1823, 1835, 1841, 1889, 1898, 1901, 2111, 2225, 2252, 2279, 2309, 2315, 2428, 2452, 2497, 2519, 3109, 3154, 3160, 3170, 3193, 3214, 3298, 3331, 3346, 3388, 3397, 3404, 3416, 3466, 3491, 3500, 3572, 4181, 4411, 4594, 4970, 5042, 5069, 5081, 5086, 5095, 5104, 5320, 5465, 5491, 6193, 6541, 6778, 6853, 6928, 6934, 7030, 7198, 7351, 7712, 7826, 7922, 8194, 8347, 8350, 8435, 8518, 8671, 8861, 8887, 9199, 9980, 10031, 10240, 10519, 10537, 10573, 10589, 11078, 11278, 11324, 11489, 11642, 12034, 12107, 12184, 12295, 12635, 12643, 12941, 12995, 13001, 13133, 13172, 13246, 13514, 13522, 13939, 14362, 14720, 14926, 15338, 15524, 15565, 15662, 15775, 16358, 16613, 16688, 16760, 17003, 17267, 17596, 17705, 18157, 18272, 18715, 18994, 19249, 19348, 20221, 20855, 21400, 21412, 21418, 21430, 21478, 21559, 21983, 21986, 22331, 22367, 22370, 22402, 22447, 22535, 22567, 22571, 22660, 22780, 22802, 22844, 22888, 22907, 23021, 23057, 23086, 23213, 23240, 23263, 23333, 23369, 23453, |

-continued

| FFT mode (Number of reserved tones) | Indexes of reserved tones |
|---|---|
| | 23594, 24143, 24176, 24319, 24325, 24565, 24587, 24641, 24965, 25067, 25094, 25142, 25331, 25379, 25465, 25553, 25589, 25594, 25655, 25664, 25807, 25823, 25873, 25925, 25948, 26002, 26008, 26102, 26138, 26141, 26377, 26468, 26498, 26510, 26512, 26578, 26579, 26588, 26594, 26597, 26608, 26627, 26642, 26767, 26776, 26800, 26876, 26882, 26900, 26917, 26927, 26951, 26957, 26960, 26974, 26986, 27010, 27013, 27038, 27044, 27053, 27059, 27061, 27074, 27076, 27083, 27086, 27092, 27094, 27098, 27103, 27110, 27115, 27118, 27119, 27125, 27128, 27130, 27133, 27134, 27140, 27143, 27145, 27146, 27148, 27149 |

20. The receiving apparatus of claim 15, wherein the preamble comprises a P2 symbol that carries signaling information of a physical layer in a Digital Video Broadcasting (DVB) system.

* * * * *